(12) United States Patent
Laforce et al.

(10) Patent No.: US 12,085,166 B1
(45) Date of Patent: Sep. 10, 2024

(54) EXTERNALLY MOUNTED PARKING SYSTEM

(71) Applicant: Dana Heavy Vehicle Systems Group, LLC, Maumee, OH (US)

(72) Inventors: Nicholas W. Laforce, Whitehouse, OH (US); George A. Willford, Waterville, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/296,924

(22) Filed: Apr. 6, 2023

(51) Int. Cl.
*F16H 63/34* (2006.01)
*B60T 1/00* (2006.01)

(52) U.S. Cl.
CPC .......... *F16H 63/3466* (2013.01); *B60T 1/005* (2013.01); *F16H 63/3425* (2013.01); *F16H 63/3483* (2013.01)

(58) Field of Classification Search
CPC ............ F16H 63/3416; F16H 63/3425; F16H 63/3433; F16H 63/3441; F16H 63/345; F16H 63/3458; F16H 63/3461–63/3491; B60T 1/005
See application file for complete search history.

(56) References Cited

U.S. PATENT DOCUMENTS

| | | | |
|---|---|---|---|
| 8,840,506 B2 | 9/2014 | Schwekutsch et al. | |
| 10,876,628 B2 | 12/2020 | Gruber et al. | |
| 11,473,678 B2 | 10/2022 | Merwin et al. | |
| 2014/0155214 A1* | 6/2014 | Kimura | F16H 57/045 475/160 |
| 2018/0283419 A1* | 10/2018 | Tachibanada | F16D 41/125 |
| 2019/0154149 A1 | 5/2019 | Gruber et al. | |
| 2019/0211928 A1 | 7/2019 | Puiu et al. | |
| 2022/0307597 A1* | 9/2022 | Nakamura | F16H 63/3433 |

FOREIGN PATENT DOCUMENTS

| | | | | |
|---|---|---|---|---|
| CN | 114508590 A | * | 5/2022 | ......... F16H 63/3425 |
| DE | 10114031 B4 | * | 7/2006 | ............ F16H 3/089 |
| DE | 102017217829 A1 | | 4/2019 | |
| DE | 102022200520 A1 | * | 12/2022 | |

* cited by examiner

Primary Examiner — Stacey A Fluhart
(74) Attorney, Agent, or Firm — McCoy Russell LLP

(57) ABSTRACT

Parking system and method. In one example, an externally mounted parking system includes a parking system case that is externally mounted to a transmission case of a transmission and a parking system actuator that actuates a mechanism which selectively prevents movement of a gear in the transmission. In the parking system the mechanism is rotationally mounted in the parking system case and a gear reduction assembly in the system is coupled to the transmission through an opening in the transmission case and an opening in the parking system case.

8 Claims, 3 Drawing Sheets

EXTERNALLY MOUNTED PARKING SYSTEM

TECHNICAL FIELD

The present disclosure relates to a parking system which is externally mounted in a powertrain.

BACKGROUND AND SUMMARY

Parking mechanisms are used in vehicles to prevent unintentional movement of the vehicle after it comes to a rest. Some vehicles specifically include parking mechanisms that are directly integrated into a gearbox. For instance, a parking gear may be attached to a shaft in the gearbox and a pawl may be used to inhibit movement of the parking gear.

US 2019/0154149 A1 to Gruber et al. discloses a park lock unit that is directly coupled to a driveshaft of an electric powertrain and particularly a rotor shaft of the traction motor. In Gruber's park lock system, the motor's housing reacts loads transmitted to the parking system.

The inventors have recognized several drawbacks with Gruber's park lock system as well as other previous park lock systems. For instance, Gruber's park lock system may not be capable of holding the powertrain stationary at higher grades. Further, if a park lock system integrated into a driveline were designed to support high grade capabilities, the system may be costlier and difficult to package due to the higher gearbox ratio demanded for the higher grade capabilities. Conversely, if a lower gearbox ratio was used in a gearbox, the park lock system would have to grow in size to support the higher loads. Still further, some vehicle platforms may not utilize a parking mechanism. Therefore, undesirable tradeoffs may be made with regard to design, cost, and packaging for different customers. Additionally, in Gruber's system, reacting loads from the parking system through the motor housing may demand extensive redesign of the motor assembly, thereby increasing development and manufacturing costs.

The inventors have developed an externally mounted parking system to at least partially overcome the abovementioned issues with previous park lock systems. The parking system includes, in one example, a parking system case that is externally mounted to a transmission case of a transmission. The parking system further includes a parking system actuator that actuates a rotation arresting mechanism. In such an example, the rotation arresting mechanism is rotationally mounted in the parking system case. The parking system further includes a gear reduction assembly that is coupled to the transmission through an opening in the transmission case and an opening in the parking system case. Still further, in such an example, the rotation arresting mechanism is designed to selectively prevent rotation of a parking system gear that is included in the gear reduction assembly. In this way, the loads on the rotation arresting mechanism are reacted through the dedicated parking system housing that is separate from the transmission housing. Consequently, the modularity of the system is increased when compared to park lock systems that are integrated into the transmission. Further, using a modular parking system allows the system to be used with multiple types of braking and suspension packages (e.g., air brakes, hydraulic brakes, leaf suspension, air suspension, and the like). Consequently, the system's applicability is increased.

In one example, the gear reduction assembly further includes a first stage and a second stage. Further, in such an example, a gear in the first stage may be coaxially positioned in relation to a gear in the second stage. Using multiple stages in the gear reduction assembly allows the torque exerted on the parking system, and particularly the pawl, to be reduced. Consequently, the size of the rotation arresting mechanism and associated componentry may be reduced. Additionally, mounting the gear reduction stages coaxially allows the compactness of the parking system to be further increased. Customer appeal of the parking system may be resultantly increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A modular parking system is described herein that is designed to be externally mounted on transmission and reacts loads through a parking system case that is separate from the transmission's housing. To achieve this modularity, the parking system case includes an opening that aligns with an opening in the transmission housing. A gear reduction assembly includes a gear that interfaces with a gear in the transmission. In this way, the parking system is able to be efficiently and seamlessly attached to the transmission. The parking system further includes a parking system actuator that selectively engages a rotation arresting mechanism (e.g., a cam which interacts with a pawl). Both the cam and the pawl are rotationally mounted to the parking system case. In this way, the load from the rotation arresting mechanism (e.g., a pawl gear which mates with the pawl) during system engagement, is transferred to the parking system case. As a result, the parking system does not demand an extensive redesign of the transmission housing and associated components, enabling simplified incorporation of the parking system into a wide variety of transmissions and vehicle platforms, more generally. Further, the parking system may include a multi-stage gear reduction to reduce loads on the rotation arresting mechanism.

Figure 1:
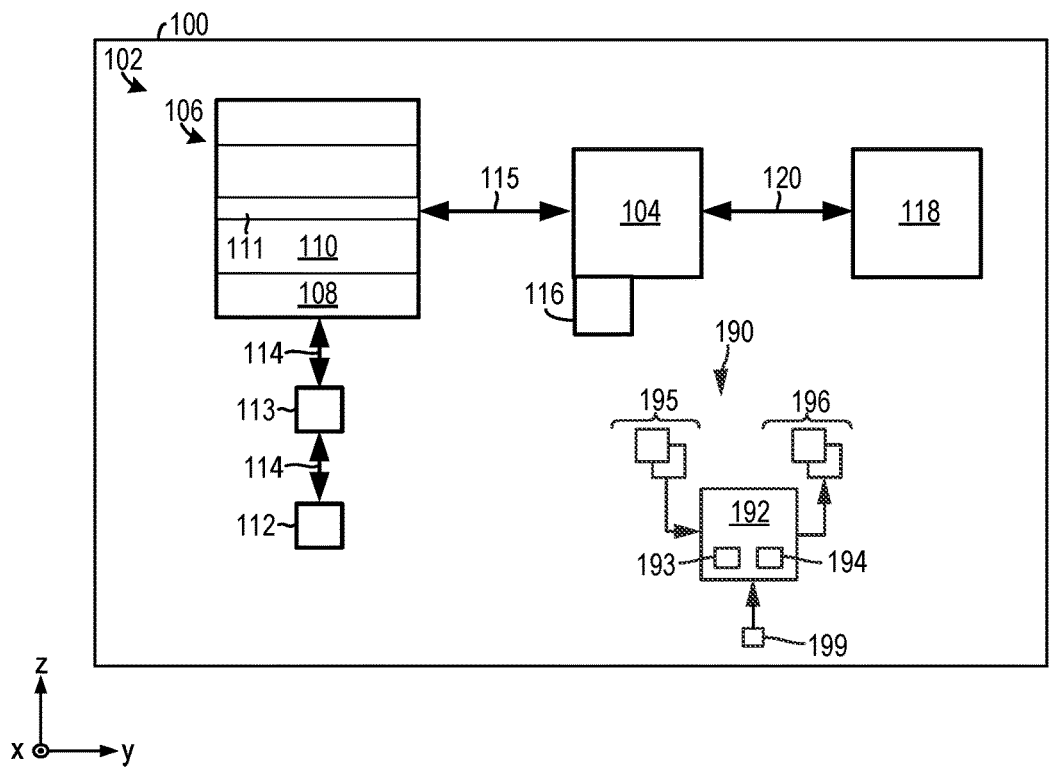
FIG. 1 shows a multi-speed gearbox in a powertrain of a vehicle.

FIG. 1 shows a vehicle 100 with a powertrain 102 that includes a transmission 104 and a prime mover, which in the illustrated example is a traction motor 106. However, in other examples, the prime mover may be an internal combustion engine or the powertrain may be a hybrid type powertrain. The powertrain 102 is an electric powertrain, in the illustrated example. The electric powertrain may specifically be an all-electric powertrain. An all-electric powertrain may be used due to its reduced complexity and therefore reduced points of potential component degradation in comparison to other types of powertrains such as hybrid powertrains or internal combustion engine powertrains.

In the hybrid electric powertrain example, an internal combustion engine may be used to recharge one or more energy storage device(s) 112 and/or drive one or more axles.

Further, in alternate examples, the powertrain may be a powertrain with an internal combustion engine that generates motive power.

The powertrain 102 may specifically be an electric drive unit such as an electric axle, in one example, which can be more easily incorporated into a variety of vehicle platforms when compared to other types of electric drives. To elaborate, the electric axle may be an electric beam axle that is coupled to a dependent suspension system to increase axle durability and articulation when compared to axles that are coupled to independent suspension systems. However, the axle may be coupled to an independent suspension system, in other examples. Further in other examples, the axle may receive mechanical power from an internal combustion engine.

The vehicle 100 may be an all-electric vehicle in one example, although alternative examples are possible such as a hybrid electric vehicle (HEV) that utilizes an internal combustion engine for propulsion and/or recharging of an energy storage device. Further, the vehicle 100 may be a light, medium, or heavy duty vehicle, for instance. To elaborate, the vehicle may be a commercial vehicle (e.g., a vehicle that has a gross weight which is greater than or equal to 4,536 kilograms (kg)), in one use-case example.

The powertrain 102 (e.g., electric drive unit) includes the traction motor 106 with a stator 108 which electromagnetically interacts with a rotor 110 to generate motive power during motor operation. The rotor 110 includes a rotor shaft 111. Further in one example, the traction motor 106 may be a motor-generator which is designed to generate electrical energy during regeneration operation.

The traction motor 106 may be electrically coupled to one or more energy storage device(s) 112 (e.g., one or more traction batteries, capacitor(s), fuel cell(s), combinations thereof, and the like) by way of an inverter 113 when the machine is designed as alternating current (AC) machine. However, a direct current (DC) electric machine may be used, in alternate examples.

Arrows 114 denote the electrical connection between the traction motor 106, the inverter 113, and the energy storage device(s) 112. The inverter 113 may be designed to convert DC to AC and vice versa. In one use-case example, the traction motor 106 and the inverter 113 may be three-phase devices which can achieve greater efficiency when compared to other types of motors. However, motors and inverters designed to operate using more than three phases have been envisioned.

The traction motor 106 is mechanically coupled to the transmission 104 (e.g., a gearbox) as illustrated via arrows 115. The transmission 104 may be a single speed transmission, in one example, or a multi-speed transmission, in another example.

A parking system 116 is coupled to the transmission 104. The parking system 116 is schematically depicted in FIG. 1. However, it will be appreciated that the parking system has greater structural complexity and componentry that is expanded upon herein with regard to FIGS. 2A, 2B, and 3 which illustrate exemplary parking systems.

FIG. 1 further shows the transmission 104 mechanically coupled to one or more differentials 118, as indicated via arrows 120. The differentials are in turn coupled to drive wheels via axle shafts.

The powertrain 102 may further include a control system 190 with a controller 192 (e.g., vehicle control module (VCM)) as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data representing instructions executable by a processor for performing the methods and control techniques described herein.

The controller 192 may receive various signals from sensors 195 coupled to various regions of the vehicle 100 and the transmission 104. For example, the sensors 195 may include a pedal position sensor designed to detect a depression of an operator-actuated pedal such as an accelerator pedal and/or a brake pedal, a speed sensor at the transmission output shaft, energy storage device state of charge (SOC) sensor, clutch position sensors, and the like. Motor speed may be ascertained from the amount of power sent from the inverter to the electric machine. An input device 199 (e.g., accelerator pedal, brake pedal, drive mode selector, combinations thereof, and the like) may further provide input signals indicative of an operator's intent for vehicle control.

Upon receiving the signals from the various sensors 195 of FIG. 1, the controller 192 processes the received signals, and employs various actuators 196 of vehicle and/or electric drive unit components to adjust the components based on the received signals and instructions stored on the memory of controller 192. For example, the controller 192 may receive an accelerator pedal signal indicative of an operator's request for increased vehicle acceleration. In response, the controller 192 may command operation of the inverter 113 to adjust electric machine mechanical power output and increase the power delivered from the traction motor 106 to the transmission 104. The controller 192 may, during certain operating conditions, be designed to send commands to the parking system to engage and disengage the system. These commands may be triggered via operator interaction with an input device or automatically triggered based on powertrain operating conditions.

Figure 2A:
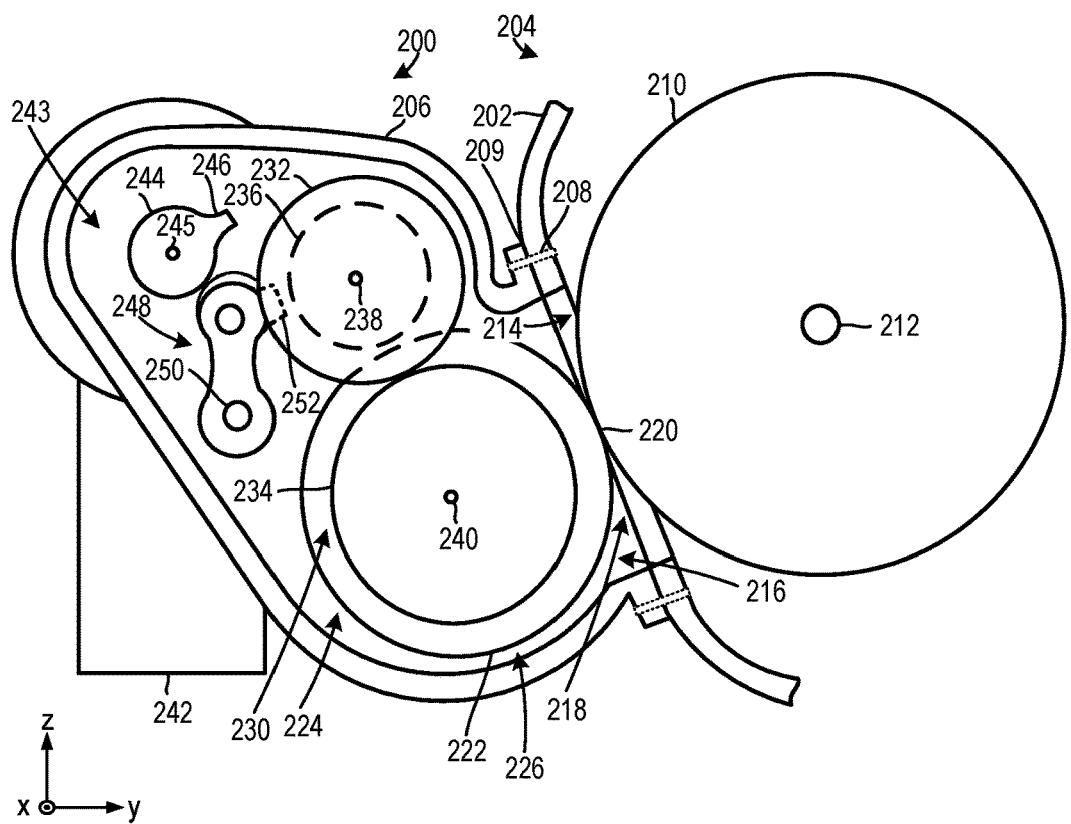
FIGS. 2A and 2B show an example of a parking system that is externally mounted to a transmission case.
Figure 2B:
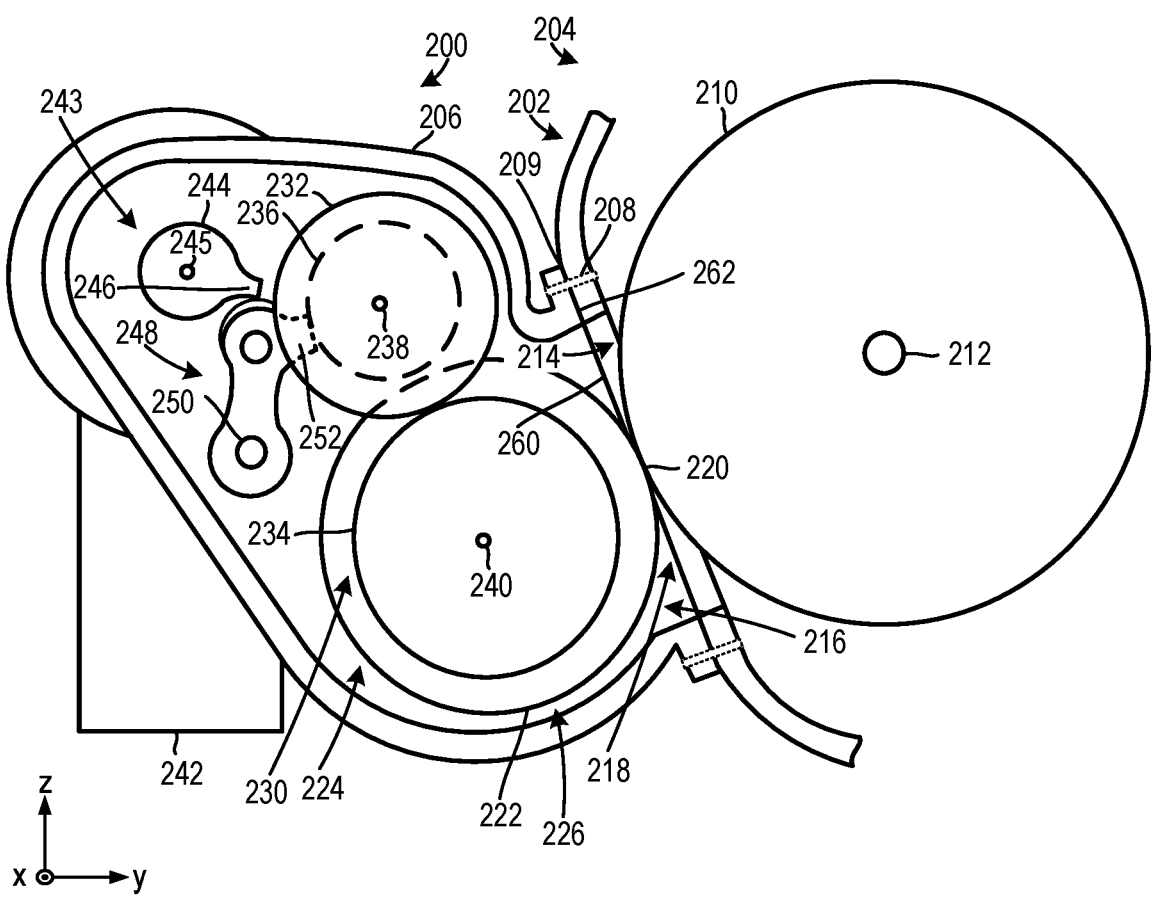
Figure 3:
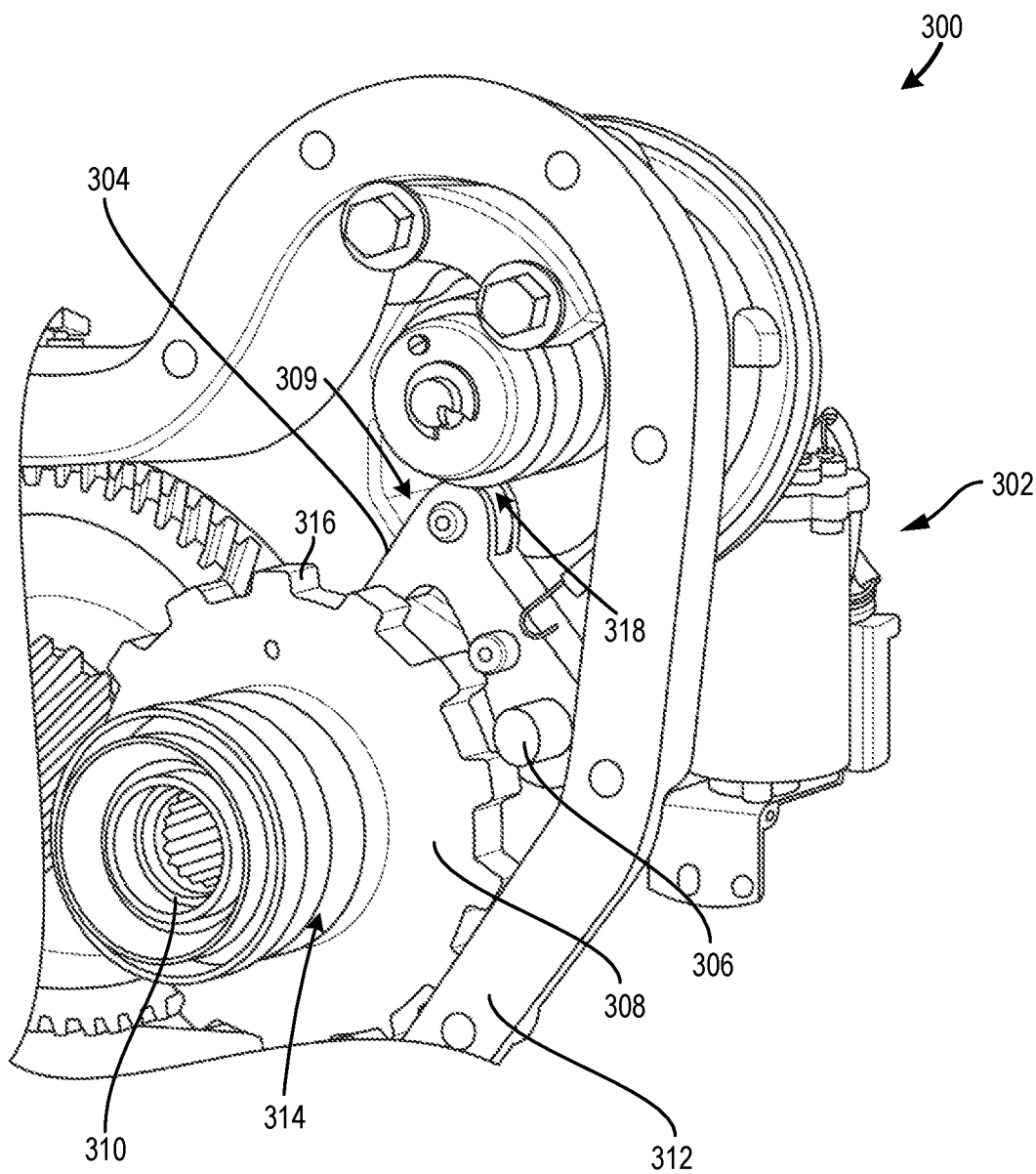
FIG. 3 shows another example of a parking system.

An axis system is provided in FIG. 1 as well as FIGS. 2A, 2B, and 3 for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

It will be appreciated that the powertrain 102 shown in FIG. 1 may have many possible architectures. For instance, the electric drive unit may include a single speed transmission, in one example, or a multi-speed transmission, in another example.

FIGS. 2A and 2B show an example of an externally mounted parking system 200 coupled to a transmission case 202 (e.g., gearbox case) of a transmission 204 (e.g., gearbox). To elaborate, a parking system case 206 is coupled (e.g., detachably coupled) to the transmission case 202. Mechanical attachment devices 208 (e.g., bolts, screws, clamps, pins, combinations thereof, and the like) and/or other attachment techniques (e.g., welding, interference fitting, and the like) may be used to efficiently and removably attach the parking system case 206 to the transmission case 202. The mechanical attachment device 208 may extend through the transmission case 202 and the parking system case 206 at planar interfaces 209, to further increase installation efficiency of the parking system 200. However, other mounting techniques between the transmission case and the parking system case may be used, in other examples.

The mechanical attachment devices 208 may be bolts, pins (e.g., dowel pins), combinations thereof, and the like that mate with openings (e.g., threaded openings) in the parking system case 206. The use of dowel pins provides more robust locating of the mating surfaces. The openings may be blind holes to prevent oil from migrating through the bolts, in one example. However, in other examples, the openings may be through holes. An O-ring mated in a groove and/or a room temperature vulcanizing (RTV) sealant may be used to seal the flange surfaces 260 and 262 of the transmission case 202 and the parking system case 206, respectively.

The transmission case 202 may at least partially circumferentially surround a gear 210 (e.g., a transmission gear). In the illustrated example, the gear 210 is fixedly coupled to a shaft 212. The shaft 212 may be an input shaft, in one example, to simplify installation of the parking system 200. Consequently, customer appeal is increased. However, in other examples, the shaft 212 may be another suitable shaft in the transmission such as an output shaft or an idler shaft. More generally, the gear 210 may be a gearbox reduction gear that functions to move the vehicle. The location of the externally mounted parking system may be selected such that it can engage the gear 210 but still clear surrounding vehicle components. Still further in other examples, the gear 210 may be omitted, and the shaft 212 may be directly rotationally coupled to a gear 222 in a gear reduction assembly 224.

The transmission case 202 includes an opening 214 that is aligned with an opening 216 in the parking system case 206. An interface 218 is formed where the openings 214 and 216 adjoin. A mesh 220 between the gear 210 and the gear 222 in the gear reduction assembly 224 may be positioned at or near the interface 218, to allow the parking system to be space efficiently incorporated into the transmission.

The gear 222 may be included in a first stage 226 which includes a pair of gears (e.g., the gear 222 and the gear 210). The gear 222, and in some cases the gear 210, may be included in the gear reduction assembly 224. However, in other examples, the gear 210 may be conceptually included in the transmission (e.g., the gearbox). The gear reduction assembly 224 may include a second stage 230 which includes a pair of gears (gear 232 and gear 234). Specifically, in the illustrated example, the gear reduction assembly includes solely two stages. However, in other examples, the gear reduction assembly may include a single stage or more than two stages.

The gear reduction assembly 224 further includes a pawl gear 236. The pawl gear 236 and the gear 232 may be coaxially arranged and fixedly coupled to a shaft 238. Likewise, the gear 222 and the gear 234 maybe coaxially arranged and fixedly coupled to a shaft 240. The shafts 238 and 240 may be supported in the parking system case 206 via bearings, for instance. To elaborate, the shafts 238 and 240 may each be mounted in bearings on each end of the shaft. The gearing in the gear reduction assembly may be correspondingly mounted to each shaft accordingly.

The first stage 226 and the second stage 230 may specifically be a primary stage gear reduction and a secondary stage gear reduction when the gear reduction assembly includes two stages. Further, the gears in any of the stages in the gear reduction assembly may be referred to as parking gears.

Although, a portion of the transmission case 202 is obscured from view, it will be appreciated that the transmission case 202 may at least partially surround the gear 210.

The parking system 200 further includes a parking system actuator 242. The parking system actuator 242 may be an electric motor, in one example. In such an example, the electric actuator may be controlled by a controller such as a VCM. In another example, the actuator 242 may be a hydraulic actuator or a pneumatic actuator. In such an example, the hydraulic or pneumatic lines may be fluidly coupled to a hydraulic or pneumatic vehicle system. In an alternate example, the parking system 200 may be actuated via mechanical linkages and/or cables, for instance.

In the illustrated example, the actuator 242 is configured to actuate a rotation arresting mechanism 243 that is configured to selectively prevent rotation of the parking system gear 236 (e.g., pawl gear). In the illustrated example, the rotation arresting mechanism 243 includes a cam 244 and a parking pawl 248. However, the rotation arresting mechanism 243 may include a variety of other suitable mechanical componentry for selectively preventing rotation of a gear in the parking system, in alternate examples. Further, in the illustrated example, the cam 244 (e.g., rotate the cam about a pivot 245 which may be mounted to the parking system case 206). For instance, the electric motor may rotate the cam directly or may rotate gears, chains, and the like that are coupled to the cam. The cam 244 may have a high and low lift which determines the pawl position. Additionally, the cam 244 includes a protrusion 246. The protrusion 246 may function as a mechanical stop for over-engagement. Further, the cam 244 induces rotation of the parking pawl 248 about pawl pivot 250.

The parking pawl 248 includes an extension 252 that selectively mates with teeth in the pawl gear 236. To elaborate, in the illustrated embodiment, rotation of the pawl 248 in the clockwise direction induces mating of the pawl with the pawl gear teeth to engage the parking system and inhibit transmission rotation. Conversely, rotation of the pawl 248 in the counterclockwise direction induces disengagement of the pawl from the pawl gear teeth to disengage the parking system and again allow for transmission rotation. In this way, the parking system may be efficiently engaged and disengaged. However, other suitable configurations of the parking system may be used in other examples, which may include different mechanical features that are designed to selectively prevent rotation of the parking system gear.

FIG. 2A shows the parking system 200 in a disengaged configuration where the extension 252 of the pawl 248 is spaced away from the pawl gear 236. Conversely, FIG. 2B shows the parking system 200 in an engaged configuration where the extension 252 of the pawl 248 mates with the pawl gear 236.

FIG. 3 shows another example of a parking system 300. It will be understood that the parking system 300 may include features from the other parking systems described herein such as the gear reduction assembly as well as the parking system case that mounts to the transmission case and vice versa. The parking system 300 includes an actuator which is illustrated as an electric motor 302. However, other suitable actuators may be used in other examples, as discussed above. The electric motor 302 is configured to rotate a pawl 304 about a pivot 306. Rotation of the pawl 304 allows the pawl to engage and disengage from a pawl gear 308 to enable engagement and disengagement of the parking system 300. The pawl is included in a rotation arresting mechanism 309. However, in alternate examples the rotation arresting mechanism may include other suitable components.

In the illustrated example, the pawl gear 308 is mounted on a shaft 310. The shaft 310 may be mounted to a case 312 via bearings 314. The bearings 314 may be coupled to the case 312, one example. The pawl gear 308 includes teeth 316 that allow the gear to interact with the pawl such that the pawl inhibits movement of the pawl gear when the teeth are engaged by the pawl.

Further, the electric motor 302 is mounted on the outside of the case 312 in the illustrated example. However, other motor mounting positions have been contemplated. The electric motor 302 is configured to rotate a cam 318. In turn, rotation of the cam 318 induces movement of the pawl 304 into and out of engagement with the pawl gear 308. In this way, the parking system may be engaged and disengaged as desired. It will be appreciated that the case 312 may be removably attached to a transmission case, using any of the techniques described above with regard to FIGS. 1-2B.

FIGS. 1 and 2A, 2B, and 3 provide for a method used to operate a parking system. The method may be implemented by the parking system described above or other suitable parking system variants. The method includes engaging a rotation arresting mechanism to prevent rotation of a parking system gear in a multi-stage gear reduction via operation of a parking system actuator that actuates the rotation arresting mechanism. The parking system actuator may be triggered via operator interaction with an input device (e.g., a gear selector, button, switch, and the like) that signals the operator's intent to engage and disengage the parking system. In other examples, the actuator may be automatically triggered via a controller absent of operator interaction with an input device.

The technical effect of the parking system operating method described herein is to effectively engage the system's rotation arresting mechanism using a space efficient system that is modular.

FIGS. 1, 2A-2B, and 3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such. Still further, an axis about which a component rotates may be referred to as a rotational axis.

The invention will be further described in the following paragraphs. In one aspect, an externally mounted parking system is provided that comprises a parking system case externally mounted to a transmission case of a transmission; a parking system actuator actuating a cam that interacts with a pawl, wherein the cam and the pawl are rotationally mounted in the parking system case; and a gear reduction assembly coupled to the transmission through an opening in the transmission case and an opening in the parking system case, and including a pawl gear; wherein the pawl is designed to selectively engage with the pawl gear.

In another aspect, an externally mounted parking system is provided that comprises a parking system case externally mounted to a transmission case of a transmission; a parking system actuator actuating a rotation arresting mechanism, wherein the rotation arresting mechanism is rotationally mounted in the parking system case; and a gear reduction assembly coupled to the transmission through an opening in the transmission case and an opening in the parking system case, and including a parking system gear; wherein the rotation arresting mechanism is configured to selectively prevent rotation of the parking system gear.

In another aspect, an externally mounted parking system for a gearbox in an electric drive unit is provided that comprises a parking system case externally mounted to a gearbox case of the gearbox; a parking system actuator actuating a cam that interacts with a pawl, wherein the cam and the pawl are rotationally mounted in the parking system case; and a multi-stage gear reduction assembly including: a primary reduction parking gear that is configured to mesh with a transmission gear and a secondary reduction parking gear that is rotationally coupled to a pawl gear; wherein the mesh between the primary reduction parking gear and the transmission gear is formed at adjacent openings in the gearbox case and the parking system case; and wherein the pawl is designed to selectively engage with the pawl gear.

In yet another aspect, a method for operation of a parking system is provided that comprises engaging a rotation arresting mechanism in a multi-stage gear reduction via operation of a parking system actuator to prevent rotation of a parking system gear; wherein the parking system includes: a parking system case externally mounted to a gearbox case of the gearbox; the parking system actuator; the cam and the pawl rotationally mounted in the parking system case; and the gear reduction assembly coupled to the gearbox through openings in the gearbox case and the parking system case, and the parking system gear.

In any of the aspects or combinations of the aspects, the gear reduction assembly may include a first stage and a second stage.

In any of the aspects or combinations of the aspects, a gear in the first stage may be coaxially positioned in relation to a gear in the second stage.

In any of the aspects or combinations of the aspects, the parking system actuator may be an electric motor.

In any of the aspects or combinations of the aspects, the parking system actuator may be a hydraulic actuator or a pneumatic actuator.

In any of the aspects or combinations of the aspects, the parking system case may be removably mounted to the transmission case.

In any of the aspects or combinations of the aspects, the transmission may be a gearbox in an electric drive unit.

In any of the aspects or combinations of the aspects, the transmission may be a non-electric gearbox or axle. For instance, the gearbox may receive mechanical power from an internal combustion engine, in one example.

In any of the aspects or combinations of the aspects, the electric drive unit may be an electric axle.

In any of the aspects or combinations of the aspects, the gear reduction assembly may include a gear meshing with a transmission gear that is at least partially enclosed in the transmission case.

In any of the aspects or combinations of the aspects, the transmission gear may be coupled to an input shaft of the transmission.

In any of the aspects or combinations of the aspects, the parking system actuator may be an electric motor and operating the parking system actuator may include energizing the electric motor.

In any of the aspects or combinations of the aspects, the transmission gear may be fixedly coupled to an input shaft of the gearbox.

In any of the aspects or combinations of the aspects, the gear reduction assembly may include only the first stage and the second stage.

In any of the aspects or combinations of the aspects, the parking system actuator may be a hydraulic actuator.

In any of the aspects or combinations of the aspects, the parking system actuator may include mechanical linkages and/or cables.

In any of the aspects or combinations of the aspects, the rotation arresting mechanism may include a cam and a pawl and the parking system gear may be a pawl gear.

In any of the aspects or combinations of the aspects, the electric drive unit may be an electric axle.

In any of the aspects or combinations of the aspects, the electric motor may be coupled to an outside of the parking system case.

In any of the aspects or combinations of the aspects, the pawl gear and the secondary reduction parking gear may be coupled to a shaft and a bearing may be coupled to the shaft and the parking system case.

In any of the aspects or combinations of the aspects, the secondary reduction parking gear may be positioned coaxial to the pawl gear.

In any of the aspects or combinations of the aspects, the multi-stage gear reduction assembly may include two or fewer stages.

In another representation, a parking mechanism in an electric axle is provided that comprises a housing in which a cam drive pawl is rotationally mounted, wherein the cam driven pawl is configured to selectively engage a pawl gear that is mounted in the housing and included in multi-stage gear reduction, wherein at least a portion of the gears in the multi-stage gear reduction are mounted in the housing and wherein the housing is coupled to a transmission housing at an interface through which one or more gears in the multi-stage gear reduction extend.

Note that the example control and estimation routines included herein can be used with various powertrain, electric drive, and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the vehicle and/or powertrain control system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of traction motors, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An externally mounted parking system for a gearbox in an electric drive unit, comprising:
    a parking system case externally mounted to a gearbox case of the gearbox;
    a parking system actuator actuating a cam that interacts with a pawl, wherein the cam and the pawl are rotationally mounted in the parking system case; and
    a multi-stage gear reduction assembly including:
        a first parking system gear that is configured to mesh with a transmission gear and fixedly coupled to a first shaft;
    wherein a second parking system gear is fixedly coupled to the first shaft;
    wherein the second parking system gear meshes with a third parking system gear that is fixedly coupled to a second shaft;
    wherein a pawl gear is fixedly coupled to the second shaft;
    wherein the mesh between the first parking system gear and the transmission gear is directly formed at an interface between a first opening in the gearbox case and a second opening in the parking system case;

wherein a boundary of the first opening is formed via a flange surface in the parking system case and a boundary of the second opening is formed via a flange surface in the gearbox case;

wherein the pawl is designed to selectively engage with the pawl gear; and wherein a rotational axis of the cam, a rotational axis of the parking pawl, and a rotational axis of the first parking system gear are parallel to one another.

2. The externally mounted parking system of claim 1, wherein the secondary reduction parking gear is positioned coaxial to the pawl gear.

3. The externally mounted parking system of claim 1, wherein the multi-stage gear reduction assembly includes two or fewer stages.

4. The externally mounted parking system of claim 1, wherein the parking system actuator is an electric motor.

5. The externally mounted parking system of claim 4, wherein the electric motor is coupled to an outside of the parking system case.

6. The externally mounted parking system of claim 1, wherein the parking system actuator is a hydraulic actuator.

7. The externally mounted parking system of claim 1, wherein the electric drive unit is an electric axle.

8. The externally mounted parking system of claim 1, wherein a bearing is coupled to the shaft and the parking system case.

* * * * *